United States Patent Office 3,829,533
Patented Aug. 13, 1974

3,829,533
POLYURETHANE ADHESIVES BASED ON ω,ω'-DI-ISOCYANATE DIMETHYLCYCLOHEXANE
Yutaka Matsui, Ashiya, Seiji Kazama, Kawanishi, and Masamitsu Nakabayashi, Ibaraki, Japan, assignors to Takeda Chemical Industries, Ltd., Osaka, Japan
No Drawing. Filed Mar. 31, 1972, Ser. No. 240,288
Claims priority, application Japan, Apr. 3, 1971, 46/20,571; Apr. 14, 1971, 46/23,689
Int. Cl. C08g 41/00, 22/24
U.S. Cl. 260—858                              17 Claims

ABSTRACT OF THE DISCLOSURE

This invention relates to an adhesive composition which is especially suitable for bonding polyesters or polyolefines to each other or to other substrates, which composition comprises (A) a linear high molecular polyurethane prepared by reacting a diol having a molecular weight of from about 500 to about 3,000 with ω,ω'-diisocyanato dimethylcyclohexane in amounts such as to provide a ratio of NCO/OH of around 1, and (B) about 1–10 parts by weight of ω,ω'-diisocyanato dimethylcyclohexane or its NCO-terminated prepolymer prepared by reacting a low molecular diol or polyol having a molecular weight of not higher than about 400 and having at least 2 hydroxyl groups per molecule with an excess amount of ω,ω'-diisocyanato dimethylcyclohexane. Another variation of the present invention is the use of an adhesive composition made up of (C) a hydroxyl-terminated polyurethane prepolymer prepared by reacting a diol having a molecular weight of from about 500 to about 3,000 with ω,ω'-diisocyanato dimethylcyclohexane in amounts such that the ratio of NCO/OH is slightly higher than 1, to give an NCO-terminated prepolymer, and then reacting the resultant NCO-terminated prepolymer with a low molecular polyol having at least 3-hydroxyl groups per molecule in such an amount that the ratio of NCO/OH is about 3 to about 10, and (D) an NCO-terminated prepolymer prepared by reacting a low molecular diol or polyol having a molecular weight of not higher than about 400 and having at least 2 hydroxyl groups per molecule with an excess amount of ω,ω'-diisocyanato dimethylcyclohexane.

---

This invention relates to adhesive compositions which are particularly useful for the adhesion of articles made of polyesters or polyolefines.

There have been prepared various kinds of articles (e.g. fibrous materials, fabrics, films, sheets) made of polyesters such as polyethylene terephthalate or polyolefines such as polyethylene and polypropylene and some of them have been widely put into practical use. In particular, films or sheets made of polyethylene terephthalate have found various uses in view of their excellent physical and mechanical properties, such as high mechanical strength, high resisitivity to light, oxygen, heat, chemicals, etc., and low gas permeability. But one serious defect of polyesters, such as polyethylene terephthalate, and polyolefines such as polyethylene or polypropylene is that it is quite difficult to strongly bond these materials with each other or with other substrates such as rubbers, metals, plastics, wood, etc. On the other hand, though many kinds of adhesives such as synthetic rubbers, polyesters, vinyl resin types, isocyanate types, etc., have been known and some of them are put into practical use, none of these materials is entirely satisfactory in view of their rather weak adhesive force to articles made of polyesters or polyolefines. Among the known adhesives, isocyanate-based adhesives have been considered to be the most suitable for polyester or polyolefine articles, and in fact some of the adhesives of these types, e.g. a tolylene diisocyanate-trimethylol propane adduct ("Desmodure 75," Bayer A.G., West Germany) with tolylene diisocyanate-polybutylene adipate prepolymers or tolylene diisocyanate-polyethylene adipate prepolymers ("Desmocoll 400," "Desmocoll 176," Bayer A.G., West Germany) have been put into practical use for this purpose. However, they are still unsatisfactory in view of their poor adhesive force, particularly, to polyester or polyolefine articles.

Under these circumstances, for the purpose of providing isocyanate-based adhesives having high adhesive force even to polyesters and polyolefines, the present inventors, at first, have made extensive studies on the improvement of the so-called one-can type isocyanate adhesive agents, and unexpectedly found out that a so-called one-can type polyurethane composition prepared by using ω,ω'-diisocyanato dimethylcyclohexane ($H_6XDI$) as an isocyanate component has an exceptionally strong adhesive force even to polyester or polyolefine articles.

In view of this unexpected finding, the present inventors have further made studies for providing a so-called two-can type isocyanate adhesive composition on the basis of $H_6XDI$, which shows high adhesive force even to polyesters and polyolefines, and found out quite unexpectedly that the object can be attained only if the composition is prepared in the specific manner of admixing an (1) NCO-terminated prepolymer which is prepared by reacting excess $H_6XDI$ and a diol or polyol, and (2) a hydroxyl-terminated polyurethane prepolymer which is prepared by reacting at first a high molecular diol with $H_6XDI$ to produce an NCO-terminated prepolymer, and then reacting the latter prepolymer with an excess amount of a low molecular polyol. The object of the present invention cannot be attained, if the component (2) is prepared by any of the following manners, i.e. $H_6XDI$, the high molecular diol and the low molecular polyol are reacted in one step, a high molecular polyol in place of the high molecular diol is used in the first step reaction; the second step reaction is omitted; a low molecular diol in place of the high molecular diol is used in the first step reaction; a low molecular diol in place of the low molecular polyol is used in the second step, and the like.

The present invention has been accomplished on the basis of these findings.

Thus, the principal object of the present invention is to provide an isocyanate-based adhesive capable of securely bonding articles made of polyester of polyolefine to each other or to other substrates. This object can be attained by using, in a specific manner, ω,ω'-diisocyanato dimethylcyclohexane as an isocyanate component in the production of one-can type or two-can type isocyanate adhesive composition. More particularly, one aspect of the present invention to attain the object thereof is the use of a one-can type isocyanate adhesive composition which comprises a high molecular linear polyurethane on the basis of ω,ω'-diisocyanato dimethylcyclohexane and ω,ω'-diisocyanato dimethylcyclohexane or its NCO-terminated prepolymer, and the other aspect of the present invention to attain the object thereof is the use of a two-can type isocyanate adhesive composition, which comprises an NCO-terminated prepolymer on the basis of ω,ω'-diisocyanato dimethylcyclohexane, and a hydroxyl-terminated polyurethane prepolymer, which is prepared by at first reacting a high molecular diol with ω,ω'-diisocyanato dimethylcyclohexane to produce an NCO-terminated prepolymer, and then reacting the prepolymer with an excess amount of a low molecular polyol.

The terms "one-can type composition" and "two-can type composition" have long been known and used in the field of polyurethane chemistry and industry, and the former terms include those compositions comprising, as an active ingredient, only an NCO-component or components, and on the other hand, the latter term includes such compositions comprising, as active ingredients, both an NCO-component or components and an OH-component or components. In other words, in the former composition, active groups are substantially nothing more than NCO groups, while in the latter one active groups are both NCO groups and OH groups. These terms may also be expressed as "one-component type" and "two-component type," respectively.

(I) One-can type adhesive composition
(Composition I)

The one-can type adhesive composition of the present invention [Composition (I)] comprises 100 weight parts of the following component (A) and about 1 to about 10 weight parts of the following component (B). Component (A) is a linear polyurethane prepolymer having a high molecular weight, which is prepared by reacting a high molecular diol having a molecular weight of about 500 to about 3,000 with ω,ω'-diisocyanato dimethylcyclohexane in such an amount that the ratio of the NCO groups/OH groups is around 1.

Component (B) is ω,ω'-diisocyanato dimethylcyclohexane or its NCO-terminated prepolymer which is prepared by reacting a low molecular diol or polyol having a molecular weight not higher than about 400 and at least two hydroxyl groups per molecule with an excess amount of ω,ω'-diisocyanato dimethylcyclohexane. In consideration of the adhesive force of the object adhesive composition (I), the NCO-terminated prepolymer mentioned just above is preferably used as component (B).

The ω,ω'-diisocyanato dimethylcyclohexane to be employable in the present invention includes ω,ω'-diisocyanato - 1,2 - dimethylcyclohexane, ω,ω'-diisocyanato-1,3-dimethylcyclohexane, ω,ω'-diisocyanato - 1,4 - dimethylcyclohexane and mixtures thereof.

The high molecular diol which is used for the production of component (A) is that having a molecular weight of about 500 to about 3,000, more preferably about 800 to about 2,000, and is exemplified by a polyester diol and a polyether diol. The polyester diol can be prepared by reacting one or more of glycols (e.g. ethylene glycol, propylene glycol, butylene glycol, 1,6-hexylene glycol, diethylene glycol, triethylene glycol, dipropylene glycol, etc.) with one or more of dicarboxylic acids such as a saturated aliphatic dicarboxylic acid (e.g. adipic acid, sebacic acid), an unsaturated aliphatic dicarboxylic acid (e.g. maleic acid, fumaric acid), an aromatic dicarboxylic acid (e.g. phthalic acid, isophthalic acid, etc.) or their acid anhydrides, or can be prepared by subjecting a lactone (e.g. caprolactone, methyl caprolactone, etc.) to a ring-opening polymerization by the use of a glycol (e.g. ethylene glycol, propylene glycol, butylene glycol, diethylene glycol, etc.). The polyether diol can be prepared by subjecting cyclic ethers such as ethylene oxide, propylene oxide, epichlorohydrin, oxacyclobutane, substituted oxacyclobutane, tetrahydrofuran to a ring-opening polymerization or copolymerization in the presence or absence of the glycol mentioned above.

The detailed reaction techniques or conditions may be any of the conventional ones described in prior publications (e.g. "High Polymers Vol. XVI Polyurethanes: Chemistry and Technology Part I" (1962) by J. H. Saunders and K. C. Frisch, published by Interscience Publishers, New York, N.Y., U.S. Pat. 2,890,208, U.S. Pat. 2,977,885, U.S. Pat. 2,933,478, etc.).

In reacting the high molecular diol with ω,ω'-diisocyanato dimethylcyclohexane to prepare component (A), a low molecular diol may be used in combination with the said high molecular diol in an amount of about 1% to about 20% so as to attain the desired properties (e.g. desired adhesive force and flexibility) of the objective adhesive composition (I). The low molecular diol which is employable for this purpose preferably has a molecular weight of not higher than about 60, more preferably, about 60 to about 400. Typical examples of the diol include aliphatic glycols (e.g. ethylene glycol, diethylene glycol, 1,2- and 1,3-propylene glycol, 1,2-, 1,3- and 1,4-butylene glycol, 2,2-dimethyl-1,3-propylene glycol, 1,6-hexane diol, 2,2,4-trimethyl - 1,3 - pentane-diol, etc.), cycloaliphatic diols (e.g. 2,2,4,4-tetramethyl cyclobutane-diol, 1,3-cyclopentane diol, 1,4-cyclohexane diol, 1,4-bis(hydroxymethyl)cyclohexane, 4,4-methylene-bis(cyclohexanol), etc.), aromatic glycols (e.g. 1,4-phenylene-bis(β-hydroxyethyl ether), isopropylidene-bis(β-hydroxyethyl phenyl ether), etc.) and the like.

The low molecular diol or polyol for the production of component (B) is that having a molecular weight of not higher than about 400, more preferably from about 60 to about 400 and at least 2, more preferably from 2 to 8 hydroxyl groups per molecule. The low molecular diols mentioned just above include those which are exemplified in the explanation on the production of component (A). Typical examples of the low molecular polyol mentioned just above include polyhydric alcohols having not less than 3 OH groups per molecule (e.g. trimethylol propane, 1,2,6-hexane triol, glycerin, pentaerythritol, methyl glycoside, xylitol, sorbitol, sucrose) and the like.

For the production of component (A), the high molecular diol or a mixture of the same with the low molecular diol and the ω,ω'-diisocyanato dimethylcyclohexane are allowed to react with each other in such an amount that a ratio of NCO groups/OH groups is around 1, more particularly about 0.90 to about 1.10 (this reaction is referred to as Reaction A). The Reaction A is generally conducted at about 50 to about 100° C. in the absence or presence of an inert solvent such as aromatic hydrocarbons (e.g. benzene, toluene, xylene, etc.), halogenated hydrocarbons (e.g. methylene chloride, ethylene chloride, trichloroethane, chlorobenzene, etc.), esters (e.g. ethyl acetate, butyl acetate, cellosolve acetate, etc.), ketones (e.g. acetone, methyl ethyl ketone, cyclohexanone, etc.), ethers (e.g., diisopropyl ether, tetrahydrofuran, dioxane, etc.), dimethyl formamide, and dimethyl acetamide.

Use of a catalyst such as organic metal compounds (e.g. stannous octoate, dibutyltin dilaurate, ferric acetylacetonate, phenyl mercuric acetate, etc.) and tertiary amines (e.g. triethylamine, triethylene diamine, N-methylmorpholine, etc.) can accelerate Reaction A.

When the NCO groups/OH groups ratio lies in the range of from 0.90 to lower than 1.0, the above mentioned Reaction A gives predominantly a hydroxyl-terminated linear polyurethane prepolymer, though an NCO-terminated product may coexist. Conversely, when the NCO groups/OH groups ratio lies in the range of from higher than 1.0 to 1.10, a NCO-terminated linear polyurethane prepolymer is predominantly obtained, though a hydroxyl-terminated product may coexist. And, when the ratio is 1.0, the product is theoretically that having one terminal NCO group and one terminal OH group per molecule, but actually various kinds of products are considered to be obtained.

In any event, all kinds of the above products can equally be employed in the present invention to attain substantially the same effect or result.

This reaction is carried out until the resulting linear polyurethane has a molecular weight of about 10,000 to about 50,000.

For the production of the polyurethane prepolymer of component (B), the low molecular diol or polyol or a mixture thereof and the ω,ω'-diisocyanato dimethylcyclohexane are allowed to react with each other in such an amount that the ratio of NCO groups/OH groups is not lower than about 1.5, practically about 1.5 to about 10 and, more preferably about 1.8 to about 3 (this reaction is referred to as Reaction B). When the diisocyanate is used in too large amounts, some of it remains unreacted. In this case, it is desirable that such unreacted diisocyanate is removed by a suitable means (e.g. distillation or extraction). The Reaction B is conducted at about 30 to about 100° C. in the presence or absence of an inert solvent as mentioned above. Organic metal compounds or tertiary amines as mentioned above may also be used in this reaction. In the above reaction, allophanate linkages can be produced by conducting the reaction at temperatures higher than about 100° C. or by using a catalyst (e.g. stannous octoate, phenylmercuric acetate, trimethylbenzylammonium hydroxide, etc.), and furthermore, biuret linkages can be produced by adding a small amount of water or an amine (e.g. ethylene diamine, hexamethylene diamine, butylamine, etc.) to the reaction system. When the above reaction is conducted in the presence of the inert solvent, an amount of the solvent is adjusted in such a manner that the resulting reaction solution shows a solids content of about 50 to about 90% and an NCO content of about 5 to about 25 weight percent.

The linear polyurethane prepolymer having a high molecular weight [component (A)] is admixed with component (B) in the amount of about 1 to about 10 weight parts of component (B) in terms of its solids content per 100 weight parts of component (A) in terms of its solids content.

When component (A) is a hydroxyl-terminated prepolymer, it reacts with component (B) to produce a polyurethane composition having terminal NCO groups. In order to enhance the stability of the object adhesive compositions, various additives such as antioxidants, ultraviolet ray absorbers, hydrolysis inhibitors, antifungal agents, etc. may further be added to the composition in amount not exceeding about 5 weight percent of the solids content thereof.

The total solids content of the composition (I) is generally adjusted to about 5 to about 90, more preferably about 30 to about 50 weight percent. This adjustment is conducted by controlling the amount of the solvent of component (A) and/or component (B) or by adding a solvent to the composition (I) or by removing a part of the solvent from the composition (I). The thus prepared composition (I) shows an amine equivalent of about 1,000 to about 20,000 and viscosity of about 1,000 to about 10,000 cps. (25° C.).

(II) Two-can type adhesive composition
(Composition II)

The two-can type adhesive composition of the present invention [Composition (II)] comprises 100 weight parts of the following component (C) and about 1 to about 100 weight parts of the following component (D). Component (C) is a hydroxyl-terminated polyurethane prepolymer, which is prepared by at first reacting a high molecular diol having a molecular weight of about 500 to about 3,000, more preferably about 600 to about 2,000 with ω,ω'-diisocyanato dimethylcyclohexane in such an amount that the ratio of NCO groups/OH groups is slightly higher than 1 to give an NCO-terminated prepolymer and then reacting the resulting NCO-terminated prepolymer with a low molecular polyol having at least 3 hydroxyl groups per molecule in such an amount that the ratio of OH groups/NCO groups is about 3 to about 10. Component (D) is an NCO-terminated prepolymer, which is prepared by reacting a low molecular diol or polyol having a molecular weight of not higher than about 400 and at least 2 hydroxyl groups per molecule with an excess amount of ω,ω'-diisocyanato dimethylcyclohexane.

The ω,ω'-diisocyanato dimethylcyclohexane employable in the present invention includes o-, m-, and p-isomers and a mixture of two or more thereof as mentioned before. High molecular weight diols having a molecular weight of about 500 to about 3,000, which are used for the production of component (C), preferably include the same polyester diols and polyether diols as those which are described before in the production of component (A). The low molecular polyols to be used in the production of component (C) are those containing at least 3, more preferably 3 to 8 hydroxyl groups per molecule and having a molecular weight of not higher than about 400, more preferably about 60 to about 400. Typical examples of the low molecular polyols include the same polyhydric alcohols as those which have been described in the production of component (B). Component (D) is similar to the NCO-terminated prepolymer described as component (B). Namely, component (D) is prepared by reacting the same low molecular diol or polyol used in the production of component (B) with ω,ω'-diisocyanato dimethylcyclohexane in such amounts that the ratio of NCO groups/OH groups is not lower than 1.5, practically about 1.5 to about 10, and more preferably about 2 to about 8.

For the production of component (C), at first the high molecular diol and the ω,ω'-diisocyanato dimethylcyclohexane are allowed to react with each other in such an amount that the ratio of the NCO groups/OH groups is slightly higher than 1, and more particularly about 1.02 to about 1.10 (this reaction is referred to as Reaction C). Reaction C is conducted under the same conditions as those of Reaction A to produce a high molecular linear polyisocyanate having two terminal NCO-groups. Then, the resulting polyisocyanate is reacted with the low molecular polyol in such an amount that the ratio of OH groups/NCO groups is about 3 to about 10, and more preferably about 4 to 10 to produce a hydroxyl-terminated polyurethane prepolymer [Component (C)] (this reaction is referred to as Reaction D). Reaction D is conducted at about 50 to about 100° C. For conducting Reaction D, the same inert solvent described in Reaction A may be used. Use of the same catalyst (e.g. organic metal compounds and tertiary amines) as described in Reaction A can also accelerate Reaction D.

When Reactions C and D are conducted in the presence of a solvent, the amount of the solvent is adjusted in such a manner that the content of the final product [Component (C)] in the reaction solution is about 5 to about 90%, and preferably about 20 to about 50%, whereby there is given a reaction solution having a viscosity of about 1000 to about 100,000 cps. (at 25° C.). In component (C), there may be incorporated conventional antioxidants, ultraviolet ray absorbers, hydrolysis monomers, antiseptics, etc. up to about 5% relative to the solids content as mentioned before.

The thus-produced components (C) and (D) are admixed with each other in such amounts that about 1 to about 100, more desirably about 3 to about 40 weight parts of component (D) in terms of its solids content are used relative to 100 weight parts of component (C) in terms of its solids content. The total solids content of thus-produced composition (II) is practically adjusted to about 5 to about 50 weight percent. This adjustment is conducted by controlling the amount of the solvent of component (C) and/or (D) or by adding a solvent to the composition (II) or removing a part of the solvent from the composition (II).

The thus-produced adhesive compositions (I) and (II) of the present invention can be used for bonding articles (e.g. fibrous materials, fabrics, films, sheets, etc.) made of polyesters (e.g. polyethylene terephthalate, etc.) or polyolefines (e.g. polyethylene, polypropylene, etc.) to each other or to other substrates (e.g. rubber articles, metals, plastics, woods, etc.). The present compositions can also be used as an adhesive agent for other articles than those described above. Further, as the composition (I) of the present invention can be classified as a moisture-cure type composition, it can be used also as a coating agent or sealer. When the present compositions (I) and (II) are used as an adhesive agent, the technique for the adhesion may be any of the conventional ones. For example, an article is immersed into the adhesive compositions or the compositions are applied on an article, if necessary, followed by removing a part or all of the solvent, and the thus-treated article is put on a substrate of the thus-treated articles are piled on each other, followed by allowing the articles to stand or by heating, preferably under elevated pressure.

As stated above, the present adhesive compositions can securely bond the polyester or polyolefine articles to each other or to other substrates, and this high adhesive force cannot be attained outside of the techniques and/or conditions stated as above. The following is a detailed explanation thereof.

When the $\omega,\omega'$ - diisocyanato dimethylcyclohexane ($H_6XDI$) is replaced by other isocyanate compounds such as tolylene diisocyanate (TDI), diphenylmethane diisocyanate (MDI), hexamethylene diisocyanate (HMDI) and isophorone diisocyanate (IPDI) in the present compositions, a high adhesive force cannot be obtained. In other words, only by the use of $\omega,\omega'$-diisocyanato dimethylcyclohexane can one attain an adhesive composition possessing the aforementioned exceptional adhesive properties.

Additionally, a two-can type adhesive composition similar to that of the present composition (II), wherein $\omega,\omega'$-diisocyanato dimethyl benzene (XDI) is used in place of the present $H_6XDI$, has previously been provided by two of the present inventors, and this composition shows relatively higher adhesive force than other conventional compositions. But, the present composition (II) shows still higher adhesive force than this XDI-type composition.

Regarding the composition (II) of the present invention, when the low molecular polyol having at least 3 OH groups per molecule, which is used for the production of component (C), is replaced by low molecular diol, the resulting composition (II) does not exhibit a high adhesive force. Also in the case of the combination of a polyurethane diol (OH terminated $H_6XDI$-polybutylene adipate or $H_6XDI$-polyethylene adipate prepolymer) and a NCO-terminated $H_6XDI$-trimethylol propane adduct, the object of the present invention cannot be realized.

When a large excess amount (e.g. a ratio of NCO groups/OH groups is about 1.2 or higher) of $\omega,\omega'$diisocyanato dimethylcyclohexane is used for reacting with the high molecular diol upon the preparation of components (A) and (C), the resulting adhesive compositions (I) or (II) acnnot exhibit a high adhesive force.

Further, in the preparation of component (C), when the NCO-terminated prepolymer and the low molecular polyol having at least 3 OH groups per molecule are used for reacting with each other in such an amount that the ratio of OH groups/NCO groups is more than about 10, the resulting composition (II) cannot exhibit a high adhesive force, and when this ratio is lower than about 3, there occurs gelation during Reaction D and thus, the object component (C) cannot be obtained.

In the present invention, component (C) is prepared by a so-called two-step method. When a compound corresponding to component (C) is intended to be prepared by one-step method, i.e. by a reacting $\omega,\omega'$-diisocyanato dimethylcyclohexane with a mixture of a high molecular diol and low molecular polyol having at least 3 OH groups per molecule, there occurs gelation during the raction and thus the object compound cannot be obtained.

When the ratio of component (B)/component (A) is lower than about 1/100 or more than about 10/100, the resulting composition (I) exhibits a poor adhesive force.

In the following experiments, "part(s)" means "weight part(s)" unless otherwise specified, and the relation between "weight part(s)" and "volume part(s)" is the same as that between "gram(s)" and milliliter(s)."

(1) COMPOSITION (I)

Experiment (A) Preparation of component (A)

(i) The reaction vessel equipped with a thermometer, nitrogen gas inlet, a reflux-condenser and a stirrer is charged with 385 parts of dehydrated ethyl acetate. Then, 524 parts of a polyester diol having a molecular weight of 2138, which is prepared from adipic acid and a mixture of ethylene glycol and 1,4-butanediol in a molar ratio of 6:3 by polycondensation, and 49 parts of $\omega,\omega'$-diisocyanato-1,3-dimethylcyclohexane are added. After admixing, 0.1 part of stannous octoate is further added and the mixture is stirred at 60° C. for 5 hours, after which time 4.8 parts of $\omega,\omega'$-diisocyanato-1,3-dimethylcyclohexane is added. This procedure gives a viscous liquid. This product is referred to as component (A)–(i).

(ii) A reaction vessel similar to that used in Example (i) is charged with 466 parts of dehydrated ethyl acetate. Then, 157 parts of a polyester diol having a molecular weight of 1928, which is prepared from adipic acid and a mixture of dipropylene glycol and 1,4-butanediol in a molar ratio of 4:6 by polycondensation, and 51 parts of ethylene glycol are added. After the mixture is stirred well, 97 parts of $\omega,\omega'$-diisocyanato-1,3-dimethylcyclohexane and 0.15 part of dibutyltin dilaurate are added. The mixture is further stirred at 60° C. for 4 hours, after which time 6 parts of $\omega,\omega'$-diisocyanato-1,3-dimethylcyclohexane is added. The procedure gives a viscous solution. This product is referred to as component (A)–(ii).

(iii) A reaction vessel similar to that described in Example (i) is charged with 487 parts of dehydrated methyl ethyl ketone. Then, 154 parts of a polyester diol having a molecular weight of 960, which is prepared from diethylene glycol and isophthalic acid by polycondensation, and 43 parts of diethylene glycol are added. After the mixture is stirred well, 119 parts of $\omega,\omega'$-diisocyanato-1,3-dimethylcyclohexane and 0.03 part of ferric acetylacetonate are added. The mixture is stirred at 60° C. for 7 hours, after which time 9.6 parts of $\omega,\omega'$-diisocyanato-1,3-dimethylcyclohexane and 3 parts of BHT are added, whereupon a viscous solution is obtained. This product is referred to as component (A)–(iii).

(iv) A reaction vessel similar to that used in Example (i) is charged with 157 parts of a polyester diol having a molecular weight of 1928, which is prepared from adipic acid and a mixture of propylene glycol and 1,4-butanediol in a molar ratio of 6:3 by polycondensation, 55 parts of dipropylene glycol and 454 parts of ethyl acetate, followed by the addition of 90 parts of $\omega,\omega'$-diisocyanato-1,3-dimethylcyclohexane and 0.15 part of dibutyltin dilaurate.

The mixture is allowed to react under a nitrogen gas stream at 60° C. for 8 hours, whereupon a viscous solution is obtained. Then, to this solution is added 26 parts of ethyl acetate. This product is referred to as component (A)–(iv).

(B) Preparation of component (B)

(i) A reaction vessel equipped with a thermometer, nitrogen gas inlet, a reflux-condenser and a stirrer is charged with 24 parts of ethyl acetate and 58.2 parts of $\omega,\omega'$-diisocyanato-1,3-dimethylcyclohexane. To the solution is added dropwise over 1 hour 13.4 parts of trimethylolpropane at 50 to 70° C. with stirring under dry nitrogen gas stream, followed by allowing to react at 70° C. for further 2 hours. This procedure gives a polyurethane polyisocyanate of solids content of 75% and an NCO-content of 13.2%. This product is referred to as component (B)–(i).

(ii) A reaction vessel similar to that used in Example (i) is charged with 78.2 parts of $\omega,\omega'$-diisocyanato-1,3-dimethylcyclohexane and 8.9 parts of 1,2-propylene glycol, followed by stirring at 120° C. for 8 hours. After cooling to 60° C., the reaction mixture is diluted with 29 parts of ethyl acetate to obtain a polyurethane polyisocyanate of solids content of 75% and an NCO content of 14.3%. This product is referred to as component (B)–(ii).

(C) Preparation of adhesive compositions (i) The adhesive compositions (I) of the present invention are prepared by mixing the above components (A) and components (B) in such a ratio as described in the following table (1):

TABLE 1

| Adhesive composition | Component (part) | | | | | | Constants of compositions | | |
|---|---|---|---|---|---|---|---|---|---|
| | (A)-(i) | (A)-(ii) | (A)-(iii) | (A)-(iv) | (B)-(i) | (B)-(ii) | Solids content, percent | Amine equivalent | Viscosity, 25° C. (cps.) |
| 1 | 100 | | | | 10.9 | | 60 | 11,300 | 12,000 |
| 2 | | 100 | | | 5.1 | | 40 | 6,000 | 3,500 |
| 3 | | | 100 | | | 5.4 | 40 | 7,500 | 4,700 |
| 4 | | | | 100 | 6.5 | | 40 | 5,700 | 3,300 |

(ii) As controls, the following adhesive compositions of Table 2 are prepared by the same manner as above composition 2 except that the following isocyanates are used in place of ω,ω'-diisocyanato dimethylcyclohexane:

The isocyanates used are, tolylene diisocyanate (2,4-isomer/2,6 isomer=80/20, TDI), 4,4'-diphenylmethane diisocyanate (MDI), 1,5 - naphthylene diisocyanate (NDI), 4,4' - methylene - bis(cyclohexylisocyanate) ($H_{12}MDI$), hexamethylene diisocyanate (HDI) and xylylene diisocyanate (XDI), isophorone diisocyanate (IPDI).

(ii) The adhesive force of the above adhesive compositions (I) No. 2 and No. 3 to a biaxial stretching polypropylene film (thickness: 40μ) is tested after the same manner as described in the above test (i), and the following results are obtained:

Composition (I) of the present invention:      Peel strength (g./m.)
2 ------------------------------------------ 600
3 ------------------------------------------ 500

The above adhesive composition No. 2 of the present invention does not show any changes in amine equivalent and viscosity even after storage for 6 months, and gives satisfactory adhesive force to a polyethylene terephthalate film and a polyolefine film under the same conditions as described above.

TABLE 2.—CONTROLLED COMPOSITIONS

| Controlled composition | Diisocyanate used | Reaction conditions | | Constants of composition | | |
|---|---|---|---|---|---|---|
| | | Temp. (° C.) | Time (hr.) | Solids content, percent | Amine equivalent | Viscosity, 25° C. (cps.) |
| 1 | TDI | 60 | 6 | 40 | 6,000 | 3,500 |
| 2 | MDI | 60 | 4 | 40 | 6,300 | 3,250 |
| 3 | NDI | 60 | 4 | 40 | 5,300 | 3,700 |
| 5 | $H_{12}MDI$ | 60 | 10 | 40 | 6,500 | 3,450 |
| 4 | HDI | 60 | 10 | 40 | 4,500 | 3,150 |
| 6 | XDI | 60 | 7 | 40 | 5,250 | 3,550 |
| 7 | IPDI | 60 | 10 | 40 | 6,000 | 3,300 |

(D) Test of adhesive force (i) The adhesive force of the above adhesive compositions is tested by the following method:

An adhesive composition is applied on the surface of a polyethylene terephthalate film (thickness: 50μ) to form an adhesive layer of 10μ thereon, followed by pre-drying. Two sheets of thus treated polyethylene terephthalate films are piled in such a manner that the respective adhesive layers are contacted with each other. The piled film is heated at 120° C. for 5 to 15 minutes under pressure of 3 kg./cm.$^2$ to allow a curing reaction to take place. After standing at room temperature for 24 hours, the resultant is cut into a sheet (200 x 25 mm.). On thus prepared test piece, T-peel test is conducted after a test method of ASTM D1876–61 T by using a Tensilon testing machine at a loading rate of 20 cm./min. The results are described in the following Table 3:

TABLE 3

Peel strength is expressed by an average value of 10 test pieces

| Adhesive composition | Pre-drying | | Heating for curing | | Peel strength (g./cm.) |
|---|---|---|---|---|---|
| | Temp. (° C.) | Time (min.) | Temp. (° C.) | Time (min.) | |
| Composition (I) of the present invention: | | | | | |
| 1 | 25 | 10 | 120 | 5 | 1,600 |
| 2 | 25 | 10 | 120 | 10 | 2,500 |
| 3 | 25 | 10 | 120 | 5 | 2,000 |
| 4 | 25 | 10 | 120 | 5 | 1,400 |
| Controlled composition: | | | | | |
| 1 | 25 | 10 | 120 | 15 | 300 |
| 2 | 25 | 10 | 120 | 15 | 250 |
| 3 | 25 | 10 | 120 | 15 | 100 |
| 4 | 25 | 10 | 120 | 15 | 350 |
| 5 | 25 | 10 | 120 | 15 | 250 |
| 6 | 25 | 10 | 120 | 15 | 900 |
| 7 | 25 | 10 | 120 | 15 | 600 |

(2) COMPOSITION (II)

Experiment 1

(A) Preparation of component (C)

(1) A reaction vessel equipped with a thermometer, a nitrogen gas inlet, a reflux-condenser and an agitator is charged with 109 parts of dehydrated ethyl acetate, 99 parts of polybutylene adipate diol having a molecular weight of 1980, 10.2 parts of ω,ω'-diisocyanato 1,3-dimethylcyclohexane and 0.01 part of ferric acetylacetonate. The mixture is stirred at 60° C. under a dry nitrogen gas stream for 10 hours, whereupon a viscous solution is obtained. Then, to this solution are added 1.0 part of glycerin and 95 parts of ethyl acetate, followed by maintaining the solution at 60° C. for 2 hours and cooling. This procedure gives a polyurethane polyol solution of solids content of 35% and viscosity of 5800 cps. at 25° C. This product is referred to as component (C)–(i).

(ii) A reaction vessel similar to that described in Example (i) is charged with 502 parts of ethyl acetate, 203 parts of a polyester diol having a molecular weight of 2033, which is prepared from adipic acid and a mixture of ethylene glycol and 1,4-butylene glycol in a molar ratio of 6:3 by polycondensation, 20.4 parts of ω,ω'-diisocyanato - 1,3 - dimethylcyclohexane and 0.5 part of ferric acetylacetonate, and the whole mixture is stirred at 60° C. for 4 hours. Then, to the resulting mixture is added 2.0 parts of trimethylolpropane, followed by stirring at 60° C. for 2 hours and cooling. This procedure gives a polyurethane polyol solution of solids content of 30% and viscosity of 9,500 cps. at 25° C. This product is referred to as component (C)–(ii).

(iii) A reaction vessel similar to that used in Example (i) is charged with 17 parts of ethyl acetate, 150 parts of polytetramethylene ether glycol having a molecular weight of 1,500, which is prepared by subjecting tetrahydrofuran to ring-opening polymerization, 20.4 parts of ω,ω'-diisocyanato-1,3-dimethylcyclohexane and 0.1 part of ferric acetylacetonate, followed by stirring at 60° C. for 8 hours. Then, to the resulting viscous solution are added 2.0 parts of trimethylol propane and 150 parts of ethyl acetate, followed by maintaining the solution at 60° C. for 2 hours and cooling. This procedure gives a polyurethane polyol solution of solids content of 35% and viscosity of 7,000 cps. at 25° C. This product is referred to as component (C)–(iii).

(iv) A reaction vessel similar to that used in Example (i) is charged with 502 parts of tetrahydrofuran, 203 parts of a polyester diol having a molecular weight of 2033, which is prepared from adipic acid and a mixture of ethylene glycol and 1,4-butylene glycol in a molar ratio of 6:3 by polycondensation, 20.4 parts of ω,ω'-diisocyanato-1,3-dimethylcyclohexane and 0.01 part of dibutyl tin diacetate, followed by stirring at 60° C. for 4.5 hours. Then, to the resultant is added 2.0 parts of pentaerythritol followed by stirring at 60° C. for another 2 hours and cooling. This procedure gives a polyurethane polyol of solids content of 30% and viscosity of 8,500 cps. at 25° C. This product is referred to as component (C)–(iv).

(v) A reaction vessel similar to that used in Experiment (i) is charged with 331 parts of ethyl acetate, 160 parts of dimethyl sulfoxide, 203 parts of polyester diol having a molecular weight of 2033, which is prepared from adipic acid and a mixture of ethylene glycol and 1,4-butylene glycol in a molar ratio of 6:3 by polycondensation, 20.4 parts of ω,ω'-diisocyanato-1,3-dimethylcyclohexane and 0.1 part of dibutyl tin diacetate, followed by stirring at 60° C. for 6 hours. Then, to the resultant is added a solution of 4 parts of sucrose in 40 parts of dimethyl sulfoxide, followed by stirring at 60° C. for further 3 hours and cooling. This procedure gives a polyurethane polyol of solids content of 30% and viscosity of 10,500 cps at 25° C. This product is preferred to as component (C)–(v).

(B) Preparation of component (D)

(i) A reaction vessel similar to that used in the above Example (i) is charged with 23.9 parts of ethyl acetate and 58.2 parts of ω,ω'-diisocyanato-1,3-dimethylcyclohexane: To the solution is added dropwise over 1 hour 13.4 parts of trimethylolpropane at 50 to 70° C. and with stirring under dry nitrogen gas stream, followed by allowing to react at 70° C. for further 2 hours. This procedure gives a polyurethane polyisocyanate solution of solids content of 75% and an NCO-content of 13.2%. This product is referred to as component (D)–(i).

(ii) A reaction vessel similar to that used in Example (i) is charged with 46.6 parts of tetrahydrofuran and 58.2 parts of ω,ω'-diisocyanato-1,3-dimethylcyclohexane. To the solution is added dropwise over a period of 2 hours, a solution of 8.2 parts of pentaerythritol in 20 parts of tetrahydrofuran with stirring at 50 to 70° C. under a dry nitrogen gas stream, followed by allowing the component to react 70° C. for another 3 hours. This procedure gives a polyurethane polyisocyanate solution of solids content of 75% and NCO-content of 17.1%. This product is referred to as component (D)–(ii).

(iii) A reaction vessel similar to that used in Example (i) is charged with 44 parts of dimethyl sulfoxide, 58.3 parts of ω,ω'-diisocyanato-1,3-dimethylcyclohexane and 0.001 part of dimethyl tin dilaurate. To the mixture is added dropwise over 2 hours a solution of 5.7 parts of sucrose in 20 parts of dibutyl sulfoxide with stirring at 50 to 70° C. under dry nitrogen gas stream, followed by allowing the components to react at 70° C. for another 2 hours. This procedure gives a polyurethane polyisocyanate solution of solids content of 75% and an NCO-content of 24.6%. This produce is referred to as component (D)–(iii).

(C) Preparation of adhesive compositions (i) The adhesive compositions (II) of the present invention are prepared by mixing the above components (C) and components (D) in such a ratio as described in the following Table 1:

TABLE 1

| Adhesive composition | (C)-(i) | (C)-(ii) | (C)-(iii) | (C)-(iv) | (C)-(v) | (D)-(i) | (D)-(ii) | (D)-(iii) |
|---|---|---|---|---|---|---|---|---|
| A | 100 | | | | | 10 | | |
| B | 100 | | | | | 15 | | |
| C | | | 100 | | | 10 | | |
| D | | | 100 | | | 15 | | |
| E | | 100 | | | | | 10 | |
| F | | 100 | | | | | | 10 |
| G | | | 100 | | | | 10 | |
| H | | | 100 | | | | | 10 |
| I | | | | 100 | | 15 | | |
| J | | | | | 100 | 10 | | |
| K | | | | | 100 | 10 | | |

(ii) Commercially available adhesive compositions:

(1) Desmocoll 400/Desmodure 75 composition
(2) Desmocoll 176/Desmodure 75 composition
(3) Epoxy type composition
 "Bond E–2" manufactured by Konishi-Gisukeshoten, in Japan
(4) Nitrile rubber type composition
 "Bond G–500" manufactured by Konishi-Gisukeshoten, in Japan
(5) Ester resin type composition
 "Ester-resin 30" manufactured by Toyoboseki Kabushiki Kaisha, in Japan
(6) Vinyl acetate type composition
 "Bond KE–60" manufactured by Konishi-Gisukeshoten, in Japan
(7) Neoprene type composition
 "Bond G–2" manufactured by Konishi-Gisukeshoten, in Japan (iii) Controlled adhesive compositions:

(a) The following polyurethane polyol solutions of Table 2 are prepared by the same manner as in component (C)–(ii) except that the following isocyanates are used in place of ω,ω'-diisocyanato-1,3-dimethylcyclohexane:

The diisocyanate used: tolylene diisocyanate (2,4-isomer/2,6-isomer=80/20 TDI); 4,4' - diphenylmethane diisocyanate (MDI); 1,5-naphthylene diisocyanate (NDI); 4,4'-methylene bis(cyclohexylisocyanate) ($H_{12}$MDI); hexamethylene diisocyanate (HDI); xylylene diisocyanate (XDI); and isophorone diisocyanate (IPDI).

TABLE 2.—POLYURETHANE POLYOLS

| Component | Diisocyanate used | Solids content (percent) | Viscosity (cps.) at 25° C. |
|---|---|---|---|
| (C')-(i) | TDI | 30 | 4,400 |
| (C')-(ii) | MDI | 30 | 6,000 |
| (C')-(iii) | NDI | 30 | 5,220 |
| (C')-(iv) | $H_{12}$MDI | 30 | 4,350 |
| (C')-(v) | HDI | 30 | 3,500 |
| (C')-(vi) | XDI | 30 | 3,200 |
| (C')-(vii) | IPDI | 30 | 4,100 |

(b) The following polyurethane polyisocyanates of Table 3 are prepared by the same manner as in component (D)–(i) except that the above isocyanates are also used in place, ω,ω'-diisocyanate-1,3-dimethylcyclohexane:

TABLE 3.—POLYURETHANE POLYISOCYANATES

| Product | Diisocyanate used | Solids content (percent) | NCO content (percent) |
|---|---|---|---|
| (D')-(i) | TDI | 75 | 13.5 |
| (D')-(ii) | MDI | 75 | 10.6 |
| (D')-(iii) | NDI | 75 | 11.9 |
| (D')-(iv) | $H_{12}$MDI | 75 | 9.8 |
| (D')-(v) | HDI | 75 | 14.2 |
| (D')-(vi) | XDI | 75 | 13.1 |
| (D')-(vii) | IPDI | 75 | 11.8 |

(c) The controlled adhesive compositions are prepared by mixing the above (C')–(i) to (vii) and components (D')–(i) and (vii) in such a ratio as described in the following Table 4.

TABLE 4

| Controlled adhesive composition | Combination ratio (part/part) |
| --- | --- |
| A' | (C')–(i)/(D')–(i)=100/15 |
| B' | (C')–(ii)/(D')–(ii)=100/15 |
| C' | (C')–(iii)/(D')–(iii)=100/15 |
| D' | (C')–(iv)/(D')–(iv)=100/15 |
| E' | (C')–(v)/(D')–(v)=100/15 |
| F' | (C')–(vi)/(D')–(vi)=100/15 |
| G' | (C')–(vii)/(D')–(vii)=100/15 |

(D) Test of adhesive force (i) The adhesive force of the above adhesive compositions is tested by the following method:

An adhesive composition is applied on the surface of a polyethylene terephthalate film (thickness: 50μ) to form an adhesive layer of 10μ thereon, followed by pre-drying. Two sheets of the thus treated polyethylene terephthalate films are piled in such a manner that the respective adhesive layers are in contact with each other. The piled film is heated at 100 to 150° C. for 5 to 60 minutes under a pressure of 3 kg./cm.$^2$ to allow a curing reaction to take place. After being kept at room temperature for 24 hours, the resultant is cut into a sheet (200 x 25 mm.). On the thus prepared test piece, a T-peel test is conducted according to the test method of ASTM D1876–61 T by using a Tensilon testing machine at a loading rate of 20 cm./min. The results are described in the following Table 5:

TABLE 5

Peel strength is expressed by an average value of 10 test pieces

| Adhesive composition | Pre-drying | | Heating for curing | | Peel strength (g./cm.) |
| --- | --- | --- | --- | --- | --- |
| | Temp. (° C.) | Time (min.) | Temp. (° C.) | Time (min.) | |
| Composition (II) of the present invention: | | | | | |
| A | 25 | 10 | 120 | 10 | 2,500 |
| A | 25 | 10 | 120 | 20 | 3,200 |
| B | 25 | 10 | 120 | 10 | 3,500 |
| B | 25 | 10 | 120 | 20 | 4,500 |
| C | 25 | 10 | 120 | 10 | 5,200 |
| C | 25 | 10 | 120 | 20 | 7,500T |
| D | 25 | 10 | 120 | 10 | 6,000T |
| D | 25 | 10 | 120 | 20 | 8,500T |
| E | 25 | 10 | 120 | 20 | 3,200 |
| F | 25 | 10 | 120 | 20 | 3,800 |
| G | 100 | 5 | 120 | 20 | 4,000 |
| H | 100 | 5 | 120 | 20 | 3,500 |
| I | 100 | 10 | 120 | 20 | 2,500 |
| J | 100 | 10 | 120 | 20 | 4,500 |
| K | 100 | 20 | 120 | 20 | 3,700 |
| Commercially available composition: | | | | | |
| (1) | 25 | 10 | 120 | 5 | 520 |
| (2) | 25 | 10 | 120 | 5 | 330 |
| (3) | 25 | 40 | 100 | 60 | 320 |
| (4) | 80 | 40 | 150 | 30 | 450 |
| (5) | 80 | 40 | 100 | 30 | 650 |
| (6) | 80 | 40 | 100 | 30 | 3 |
| (7) | 80 | 40 | 150 | 30 | 820 |
| Controlled composition: | | | | | |
| A' | 25 | 10 | 120 | 15 | 200 |
| B' | 25 | 10 | 120 | 15 | 400 |
| C' | 25 | 10 | 120 | 15 | 100 |
| D' | 25 | 10 | 120 | 15 | 400 |
| E' | 25 | 10 | 120 | 15 | 300 |
| F' | 25 | 10 | 120 | 15 | 2,500 |
| G' | 25 | 10 | 120 | 15 | 900 |

NOTE.—T means that substrate is destroyed.

(ii) Further, adhesive force of the adhesive compositions (II) of the present invention for a polypropylene films (thickness: 40μ) is tested according to the same manner as described in the above test (i), and the results of the following Table 6 are obtained.

TABLE 6

Peel strength is expressed by an average value of 10 test pieces

| Adhesive composition | Pre-drying | | Heating for curing | | Peel strength (g./cm.) |
| --- | --- | --- | --- | --- | --- |
| | Temp. (° C.) | Time (min.) | Temp. (° C.) | Time (min.) | |
| A | 25 | 10 | 120 | 20 | 650 |
| B | 25 | 10 | 120 | 20 | 800 |
| C | 25 | 10 | 120 | 20 | 700 |
| D | 25 | 10 | 120 | 20 | 1,050 |

Experiment 2 (Using H$_6$XDI Polyester Polyurethane Diol Type Adhesive Composition)

(A) Preparation of the polyurethane prepolymer component (i) The same reaction vessel as experiment 1 is charged with 109 parts of ethyl acetate, 99 parts of polybutylene adipate diol of molecular weight of 1980, 10.2 parts of ω,ω'-diisocyanato-1,3-dimethylcyclohexane and 0.01 part of dibutyl tin diacetonate, followed by heating at 60° C. for 10 hours with stirring under dry nitrogen gas stream to give a viscous liquid. To the liquid is added 1.4 part of 1,4-butane diol, followed by keeping at 60° C. for 2 hours and cooling. This procedure gives a polyurethane diol solution of a solids content of 35% and viscosity of 5,200 cps. at 25° C. This solution is referred to as component (E)–(i).

(ii) The same reaction vessel as experiment (i) is charged with 502 parts of ethylacetate, 203 parts of polyester diol having a molecular weight of 2033, which is prepared by polycondensation from adipic acid and a mixture of ethylene glycol and 1,4-butylene glycol in a molar ratio of 6:3, 20.4 parts of ω,ω'-diisocyanato dimethylcyclohexane and 0.5 part of ferric acetylacetonate, and the whole mixture is stirred at 60° C. for 4 hours. Then, to the resulting mixture is added 2.0 parts of dipropylene glycol, followed by stirring at 60° C. for 2 hours and cooling. This procedure gives a polyurethane diol solution of a solids content of 30% and viscosity of 8,600 cps. at 25° C. This product is referred to as component (E)–(ii).

(B) Isocyanate prepolymer component

As the isocyanate component, the component (D)–(i) of experiment 1 is used.

(C) Preparation of adhesive compositions

Adhesive compositions are prepared by mixing the above components (E) and component (D)–(i) in such a ratio as described in the following Table 7:

TABLE 7

| Adhesive composition | Component (part) | | |
| --- | --- | --- | --- |
| | (E)–(i) | (E)–(ii) | (D)–(i) |
| H' | 100 | | 10 |
| I' | | 100 | 10 |

(D) Test of adhesive force

Adhesive force of the compositions is tested by the same manner as in experiment 1. The result is described in the following Table 8:

TABLE 8

Peel strength is expressed by an average value of 10 test pieces

| Adhesive composition | Pre-drying | | Heating for curing | | Peel strength (g./cm.) |
| --- | --- | --- | --- | --- | --- |
| | Temp. (° C.) | Time (min.) | Temp. (° C.) | Time (min.) | |
| H' | 25 | 10 | 120 | 20 | 1,000 |
| I' | 25 | 10 | 120 | 20 | 950 |
| Composition A in Exp. 1 | 20 | 10 | 120 | 20 | 3,200 |
| Composition C in Exp. 1 | 25 | 10 | 120 | 20 | 7,500T |

NOTE.—T means that substrate is destroyed.

Experiment 3 (Attempted Preparation of the Present Composition (II) by a So-Called One-Step Method)

(i) The same reaction vessel as in Experiment 1 is charged with 214 parts of dehydrated ethyl acetate, 99 parts of polybutylene adipate diol having a molecular weight of 1980 and 1.0 part of glycerin, followed by stirring. To the mixture are then added 10.2 parts of ω,ω'-diisocyanato-1,3-dimethylcyclohexane and 0.01 part of ferric acetylacetonate, followed by stirring at 60° C. for 4 hours under a dry nitrogen gas stream. The product thus obtained gells and cannot be used as an adhesive composition.

(ii) The same reaction vessel as in Experiment (i) is charged with 502 parts of dehydrated ethylacetate, 203 parts of the same polybutylene adipate diol of molecular weight 2033 as used in Experiment 1–(ii) and 2.0 parts of trimethylol propane, followed by stirring. To the mixture are added 20.4 parts of ω,ω'-diisocyanato-1,3-dimethylcyclohexane and 0.5 parts of ferric acetylacetonate followed by stirring at 60° C. for 1 hour, whereupon the reaction system gels, and thus the product cannot be used as an adhesive composition.

Experiment 4 (Using Low Molecular Polyhydroxy Compounds in Place of the Polyurethane Prepolymers (Component (C)) in the Present Composition (II))

Various adhesive compositions are prepared by mixing the component (D)–(i) in Experiment 1 with a 10% trimethylol propane solution in ethyl acetate, a 10% glycerin solution in methyl ethyl ketone or a 10% pentaerythritol solution in ethyl acetate, at various ratios. By using these adhesive compositions, the same test as in Experiment 1(D) is conducted. Any of these compositions shows only 100 g./cm. or lower peel strength.

Experiment 5 (Influence of a Ratio of Component (C)/Component (D) in the Adhesive Composition (II) of the Present Invention)

The following adhesive compositions 1 to 7 are prepared by admixing component (C)–(ii) in the above Experiment 1 with component (D)–(i) in the above Experiment 1 in the ratios as listed in the following Table 9:

TABLE 9

| Adhesive composition | Component (C)-(ii) | Component (D)-(i) | Solids content ratio |
|---|---|---|---|
| 1 | 100 | 0 | 100/0 |
| 2 | 100 | 1.40 | 100/3 |
| 3 | 100 | 10 | 100/21.4 |
| 4 | 100 | 18.7 | 100/40 |
| 5 | 100 | 20 | 100/42.8 |
| 6 | 100 | 46.7 | 100/100 |
| 7 | 100 | 50 | 100/107 |

Adhesive force of the above compositions 1 to 7 is tested in the same manner as in Experiment 1 to give the following results described in Table 10;

TABLE 10

| Composition number | Pre-drying Temp. (° C.) | Pre-drying Time (min.) | Heat for curing Temp. (° C.) | Heat for curing Time (min.) | Peel strength (g./cm.) |
|---|---|---|---|---|---|
| 1 | 25 | 10 | 120 | 10 | 150 |
| 2 | 25 | 10 | 120 | 10 | 2,000 |
| 3 | 25 | 10 | 120 | 10 | 5,200 |
| 4 | 25 | 10 | 120 | 10 | 4,500 |
| 5 | 25 | 10 | 120 | 10 | 2,500 |
| 6 | 25 | 10 | 120 | 10 | 2,000 |
| 7 | 25 | 10 | 120 | 10 | 1,000 |

What we claim is:

1. An adhesive composition, which comprises 100 weight parts of the component (A) and about 1 to about 10 weight parts of the component (B), component (A) being a linear high molecular polyurethane which is prepared by reacting a diol having a molecular weight of about 500 to about 3,000 with ω,ω'-diisocyanato dimethylcyclohexane in amounts such as to provide a ratio of NCO/OH of around 1, and the component (B) being ω,ω'-diisocyanato dimethylcyclohexane or its NCO-terminated prepolymer which is prepared by reacting a low molecular diol or polyol having a molecular weight not higher than about 400 and having at least 2 hydroxyl groups per molecule with an excess amount of ω,ω'-diisocyanato dimethylcyclohexane.

2. An adhesive composition claimed in Claim 1, wherein the ratio of NCO/OH for the production of the component (A) is about 0.90 to 1.10.

3. An adhesive composition claimed in Claim 1, wherein the ratio of NCO/OH for the production of the component (A) is about 0.90 to 1.0.

4. An adhesive composition claimed in Claim 1, wherein the ratio of NCO/OH for the production of the component (A) is about 1.0 to about 1.10.

5. An adhesive composition claimed in Claim 1, wherein the diol or polyol used for the production of the component (B) is that having a molecular weight of about 60 to about 400 and having 2 to 8 hydroxyl groups per molecule.

6. An adhesive composition claimed in Claim 1, wherein the ratio of NCO/OH for the production of the component (B) is about 1.8 to about 3.

7. An adhesive composition claimed in Claim 1, wherein the diol used for the production of the component (A) is a polyester diol having a molecular weight of about 500 to about 3,000.

8. An adhesive composition claimed in Claim 1, wherein the diol used for the production of the component (A) is a polyether diol having a molecular weight of about 500 to about 3,000.

9. An adhesive composition, which comprises 100 weight parts of the component (C) and about 1 to about 100 weight parts of the component (D), component (C) being a hydroxyl-terminated polyurethane prepolymer which is prepared by reacting a diol having a molecular weight of about 500 to about 3,000 with ω,ω'- diisocyanato dimethylcyclohexane in such an amount that the ratio of NCO/OH is slightly higher than 1 to give an NCO-terminated prepolymer and then reacting the resulting NCO-terminated prepolymer with a low molecular polyol having at least 3 hydroxyl groups per molecule in such an amount that the ratio of OH/NCO is about 3 to about 10, and the component (D) being an NCO-terminated prepolymer which is prepared by reacting a low molecular diol or polyol having a molecular weight not higher than about 400 and having at least 2 hydroxyl groups per molecule with an excess amount of ω,ω'-diisocyanato dimethylcyclohexane.

10. An adhesive composition claimed in Claim 9, wherein the composition comprises 100 weight parts of the component (C) and about 3 to about 40 weight parts of the component (D).

11. An adhesive composition claimed in Claim 9, wherein the ratio of NCO/OH for the production of the NCO-terminated prepolymer of the component (C) is about 1.02 to about 1.10.

12. An adhesive composition claimed in Claim 9, wherein the diol or polyol used for the production of the component (D) is that having a molecular weight of about 60 to about 400 and having 2 to 8 hydroxyl groups per molecule.

13. An adhesive composition claimed in Claim 9, wherein the ratio of NCO/OH for the production of the component (D) is about 2 to about 8.

14. An adhesive composition claimed in Claim 9, wherein the diol used for the production of the component (C) is a polyester diol having a molecular weight of about 500 to about 3,000.

15. An adhesive composition claimed in Claim 9, wherein the diol used for the production of the component (C) is a polyether diol having a molecular weight of about 500 to about 3,000.

16. An adhesive composition claimed in Claim 9, wherein the low molecular polyol used for the production of the component (C) is that having a molecular weight of about 60 to about 400 and having 3 to 8 hydroxyl groups per molecule.

17. An adhesive composition claimed in Claim 9, wherein the ratio of OH/NCO of the NCO-terminated prepolymer and low molecular polyol is about 4 to about 10.

References Cited

UNITED STATES PATENTS

| | | | |
|---|---|---|---|
| 3,350,362 | 10/1967 | Potts et al. | 260—453 AL X |
| 3,686,146 | 8/1972 | Goto | 260—75 NP |
| 3,663,513 | 5/1972 | Kazama et al. | 260—75 NT |
| 2,929,800 | 3/1960 | Hill | 260—77.5 |
| 3,666,835 | 5/1972 | Schloss | 260—858 |
| 3,274,160 | 9/1966 | Ellegast et al. | 260—858 |
| 3,284,539 | 11/1966 | McElroy | 260—858 |
| 3,012,987 | 12/1961 | Ansul | 260—858 |
| 3,490,987 | 1/1970 | Bauriedel | 260—858 |
| 3,271,352 | 9/1966 | Weinberg | 260—858 |
| 3,094,495 | 6/1963 | Gemeinhardt | 260—858 |

HERBERT S. COCKERAM, Primary Examiner

U.S. Cl. X.R.

260—75 NT